(12) United States Patent
Vij et al.

(10) Patent No.: US 9,716,710 B2
(45) Date of Patent: Jul. 25, 2017

(54) TECHNOLOGIES FOR VIRTUALIZED ACCESS TO SECURITY SERVICES PROVIDED BY A CONVERGED MANAGEABILITY AND SECURITY ENGINE

(71) Applicant: Intel Corporation, Santa Clara, CA (US)

(72) Inventors: Mona Vij, Hillsboro, OR (US); Carlos V. Rozas, Portland, OR (US); Vincent R. Scarlata, Beaverton, OR (US); Francis X. McKeen, Portland, OR (US); Bo Zhang, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 14/752,259

(22) Filed: Jun. 26, 2015

(65) Prior Publication Data
US 2016/0381005 A1 Dec. 29, 2016

(51) Int. Cl.
*G06F 7/04* (2006.01)
*H04L 29/06* (2006.01)

(52) U.S. Cl.
CPC ...... *H04L 63/0823* (2013.01); *H04L 63/0281* (2013.01); *H04L 63/10* (2013.01)

(58) Field of Classification Search
CPC .. H04L 63/0823; H04L 63/10; H04L 63/0281

USPC ............................................................ 726/7
See application file for complete search history.

(56) References Cited

U.S. PATENT DOCUMENTS

2010/0242092 A1* 9/2010 Harris ............... H04L 63/08
726/3
2015/0227357 A1* 8/2015 Zamir .................. G06F 8/65
717/173

\* cited by examiner

*Primary Examiner* — Mohammad W Reza
(74) *Attorney, Agent, or Firm* — Barnes & Thornburg LLP

(57) ABSTRACT

Technologies for secure access to platform security services include a computing device having a processor and a security engine. The computing device establishes a platform services enclave in a virtual machine of the computing device using secure enclave support of the processor. The platform services enclave receives a platform services request from an application enclave via a first authenticated session and transmits the platform services request to a virtual security engine established by a host environment via a second authenticated session. The first and second authenticated sessions may be authenticated by report-based attestation and quote-based attestation, respectively. The virtual security engine transmits the platform services request to the security engine via a long-term pairing session established by the virtual security engine with the security engine. The security engine performs the platform services request using hardware resources shared with other platform services enclaves. Other embodiments are described and claimed.

25 Claims, 6 Drawing Sheets

TECHNOLOGIES FOR VIRTUALIZED ACCESS TO SECURITY SERVICES PROVIDED BY A CONVERGED MANAGEABILITY AND SECURITY ENGINE

BACKGROUND

Many current computing devices include one or more coprocessors or other embedded controllers to provide security and manageability services. Those coprocessors may be known as a manageability engine or a security engine. Typically, the manageability engine or security engine may be included in the memory controller, I/O controller, or other control logic of the computing device, for example as part of a platform controller hub (PCH). Certain systems-on-a-chip manufactured by Intel® Corporation incorporate a processor and integrated control circuitry in the same package and include a converged manageability and security engine (CSME).

Current processors may provide support for a trusted execution environment such as a secure enclave, also known as an architectural enclave. Secure enclaves include segments of memory (including code and/or data) protected by the processor from unauthorized access including unauthorized reads and writes. Additionally, the processor can cryptographically prove that a particular secure enclave is authentic and unaltered. Certain computing devices may establish a single platform services secure enclave that provides access to security services provided by the underlying hardware of the CSME.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 1 is a simplified block diagram of at least one embodiment of a computing device for virtualized access to security services;

FIG. 2 is a simplified block diagram of at least one embodiment of an environment that may be established by the computing device of FIG. 1;

FIG. 3 is a simplified block diagram of at least one embodiment of another environment that may be established by the computing device of FIG. 1;

FIGS. 4A and 4B are a simplified flow diagram of at least one embodiment of a method for virtualized access to security services that may be executed by the computing device of FIGS. 1 and 2; and FIG. 5 is a simplified flow diagram of at least one embodiment of another method for virtualized access to security services that may be executed by the computing device of FIGS. 1 and 3.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for secure server access includes a processor 120 having secure enclave support 122 and a security engine 132. In use, as described in more detail below, the computing device 100 executes one or more virtual machines, and each virtual machine establishes a platform services enclave using the secure enclave support 122. The platform services enclave provides a secure and isolated execution environment. The platform services enclave may receive platform service requests from application enclaves executing within the associated virtual machine. In some embodiments, a virtual security engine executing within a host environment of the computing device 100 establishes a long-term pairing session with the security engine 132. Each platform services enclave transmits platform service requests to the virtual security engine, which transmits the platform service requests to the security engine 132. The security engine 132 services the requests using shared hardware resources. In some embodiments, each platform services enclave establishes a separate long-term pairing session with the security engine 132. In those embodiments, each platform services enclave transmits platform service requests to the security engine 132 via a host messaging service. The security engine 132 services the requests using hardware resources dedicated to each of the platform services enclaves. Therefore, the computing device 100 allows for scalable, secure access to the platform services provided by the security engine 132.

Figure 1:
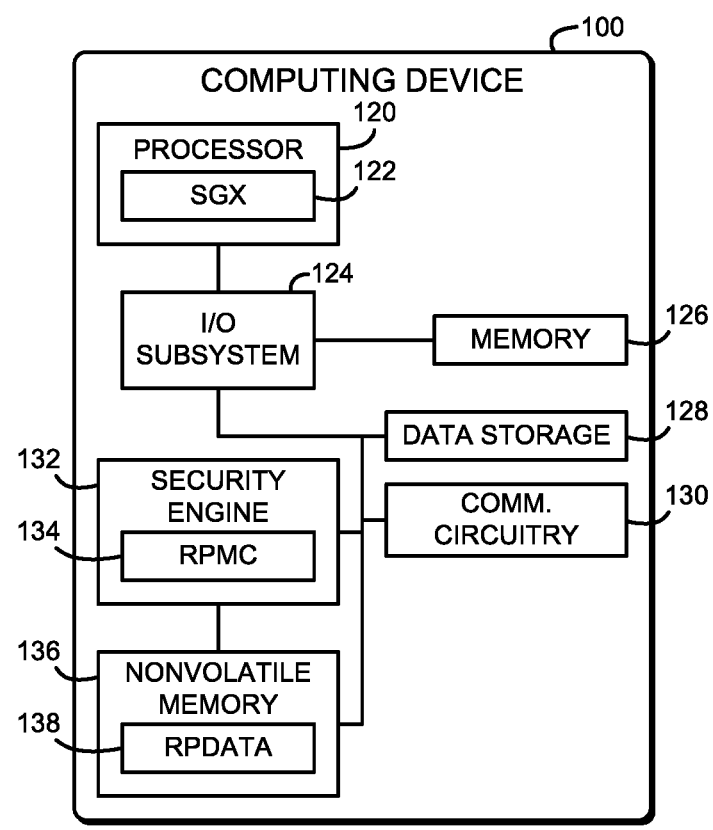

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes a processor 120, an input/output subsystem 124, a memory 126, a data storage device 128, communication circuitry 130, a security engine 132, and nonvolatile memory 136. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As described above, the processor 120 includes secure enclave support 122. The secure enclave support 122 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 126. The secure enclave support 122 may be embodied as a set of processor instruction extensions that allows the processor 120 to establish one or more secure enclaves in the memory 126. For example, the secure enclave support 122 may be embodied as Intel® Software Guard Extensions (SGX) technology.

The memory 126 may be embodied as any type of volatile or non-volatile memory or data storage capable of performing the functions described herein. In operation, the memory 126 may store various data and software used during operation of the computing device 100 such as operating systems, applications, programs, libraries, and drivers. The memory 126 is communicatively coupled to the processor 120 via the I/O subsystem 124, which may be embodied as circuitry and/or components to facilitate input/output operations with the processor 120, the memory 126, and other components of the computing device 100. For example, the I/O subsystem 124 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, the security engine 132, and other components of the computing device 100, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices. In some embodiments, the data storage device 128 may be used to store the contents of one or more secure enclaves. When stored by the data storage device 128, the contents of the secure enclave may be encrypted to prevent unauthorized access.

The communication circuitry 130 of the computing device 100 may be embodied as any communication circuit, device, or collection thereof, capable of enabling communications between the computing device 100 and other remote devices over a network. The communication circuitry 130 may be configured to use any one or more communication technology (e.g., wired or wireless communications) and associated protocols (e.g., Ethernet, Bluetooth®, Wi-Fi®, WiMAX, etc.) to effect such communication.

The security engine 132 may be embodied as any hardware component(s) or circuitry capable of providing security-related services to the computing device 100. In particular, the security engine 132 may include a microprocessor, microcontroller, or other embedded controller capable of executing firmware and/or other code independently and securely from the processor 120. The security engine 132 may communicate with the processor 120 and/or other components of the computing device 100 over a dedicated bus, such as a host embedded controller interface (HECI). The security engine 132 may also provide remote configuration, control, or management of the computing device 100. In the illustrative embodiment, the security engine 132 is embodied as a converged security and manageability engine (CSME) incorporated in a system-on-a-chip (SoC) of the computing device 100. In some embodiments, the security engine 132 may be embodied as a manageability engine, an out-of-band processor, a Trusted Platform Module (TPM), or other security engine device or collection of devices. Further, in some embodiments, the security engine 132 is also capable of communicating using the communication circuitry 130 or a dedicated communication circuit independently of the state of the computing device 100 (e.g., independently of the state of the main processor 120), also known as "out-of-band" communication. The security engine 132 further includes one or more hardware components that may be used to provide platform services to the computing device 100 such as a monotonic counter service or a trusted time service. In the illustrative embodiment, the security engine 132 includes a replay-protected monotonic counter 134.

The nonvolatile memory 136 may be embodied as any device configured for persistent storage of data when the computing device 100 is powered down or disconnected from a power supply. In the illustrative embodiment, the nonvolatile memory 136 is a flash memory chip. In other embodiments, the nonvolatile memory 136 may be embodied as a small amount of complementary metal-oxide semiconductor ("CMOS") memory coupled with a battery backup or other non-volatile memory. The nonvolatile memory 136 may be used to store platform firmware for the computing device 100. Part of the nonvolatile memory 136 may be partitioned or otherwise reserved for the use by the security engine 132, for example to store firmware for the security engine 132. Additionally, the nonvolatile memory 136 may include replay-protected data (RPDATA) 138. The RPDATA 138 may be embodied as one or more 128-bit replay-protected data storage locations. The RPDATA 138 may be used by the security engine 132 (e.g., by the replay-protected monotonic counter 134 or related firmware) to provide platform services to the computing device 100. The nonvolatile memory 136 typically has a relatively small storage capacity compared to the data storage device 128, for example including 8 to 16 128-bit values in the RPDATA 138. In some embodiments, the nonvolatile memory 136 may be incorporated into one or more other components of the computing device 100, for example into the I/O subsystem 124.

Figure 2:
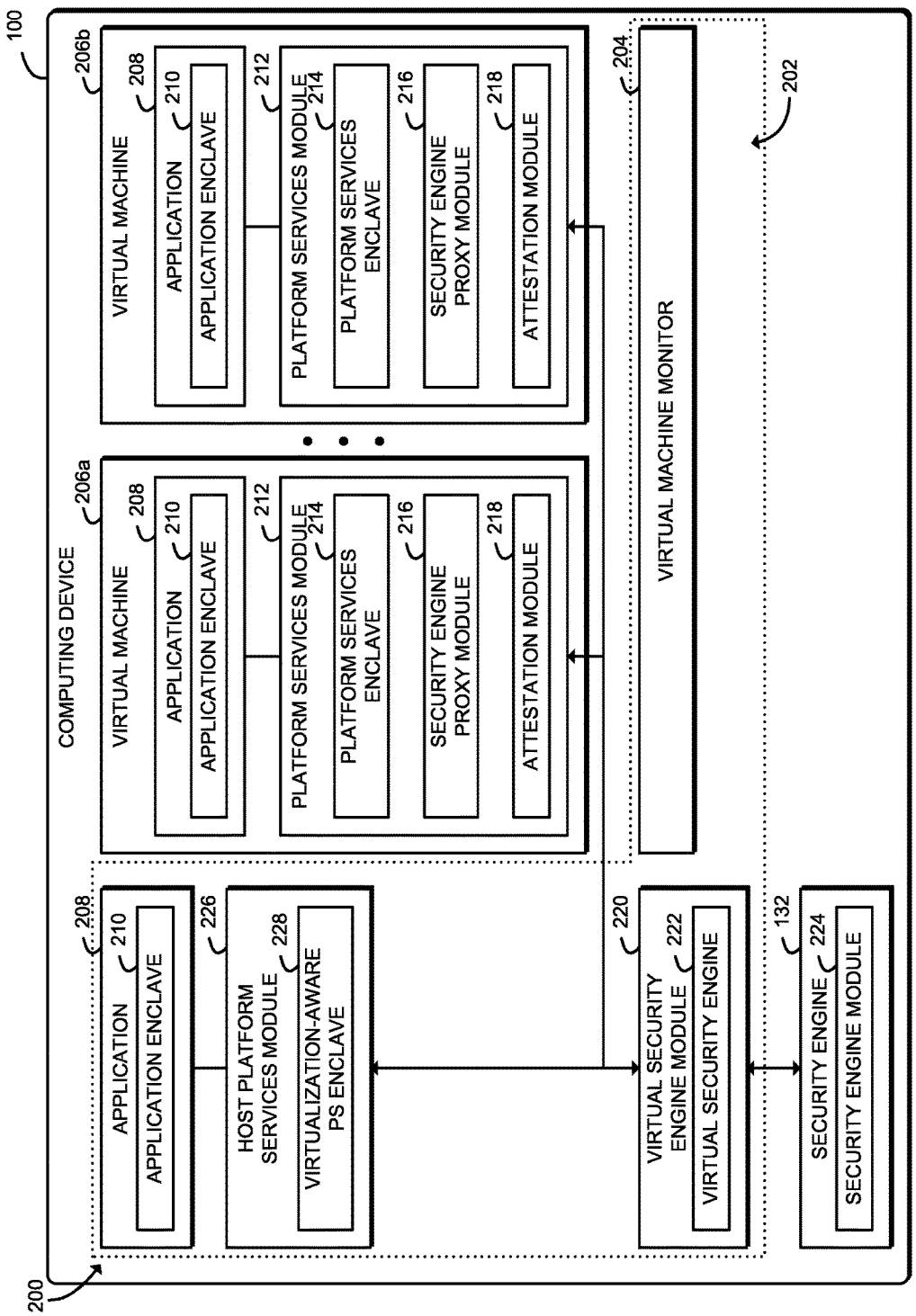

Referring now to FIG. 2, in an illustrative embodiment, the computing device 100 establishes an environment 200 during operation. The illustrative environment 200 includes a virtual machine monitor (VMM) 204, one or more virtual machines 206, a virtual security engine module 220, and a security engine module 224 established by the security engine 132. Each of the virtual machines 206 includes one or more applications 208 and a platform services module 212. The environment 200 also may include a host platform services module 226. As shown, the VMM 204, the virtual security engine module 220, the host platform services module 226, and one or more applications 208 may be established by a host environment 202 of the computing device 100. The virtual machines 206 are not included in the host environment 202. The various modules of the environment 200 may be embodied as hardware, firmware, software, or a combination thereof. For example the various modules, logic, and other components of the environment 200 may form a portion of, or otherwise be established by, the processor 120, the security engine 132, or other hardware components of the computing device 100. As such, in some embodiments, any one or more of the modules of the environment 200 may be embodied as a circuit or collection of electrical devices (e.g., a platform services circuit, a virtual security engine circuit, etc.).

The VMM 204 may be embodied as any virtual machine monitor, hypervisor, or other component that allows a virtualized workload to be executed on the computing device 100. The VMM 204 may have complete control over the computing device 100, for example by executing in a non-virtualized host mode, such as ringlevel 0 and/or VMX-root mode. Each virtual machine 206 is configured to perform a virtualized workload on the computing device 100, such as executing a guest operating system and/or applications 208. Each virtual machine 206 may execute in a limited permission guest mode that restricts access to certain hardware of the computing device 100, such as VMX-non-root mode. Although illustrated as including two virtual machines 206a, 206b, it should be understood that the computing device 100 may establish many virtual machines 206.

Each application 208 may be embodied as any user application, system application, module, script, or other computer program that is configured to be executed by the computing device 100. The application 208 may be embodied as a native application, a web application, bytecode, source code, or any other code that may be executed by the computing device 100. Each application 208 establishes one or more application enclaves 210 using the secure enclave support 122 of the processor 120. Each application enclave 210 may be embodied as a secure enclave including code and/or data that is authenticated and protected from unauthorized access and/or modification by the processor 120, such as a secure enclave established using Intel® SGX technology. Thus, the application enclave 210 provides an isolated and secure execution environment within the application 208. Although illustrated as including a single application 208 and application enclave 210, it should be understood that each virtual machine 206 may establish multiple applications 208 and/or application enclaves 210. Additionally, as shown in FIG. 2, in some embodiments the computing device 100 may execute one or more applications 208 and/or application enclaves 210 in the host environment 202, outside of any guest virtual machine 206.

Each platform services module 212 is configured to establish a platform services enclave 214. Similar to the application enclave 210, each platform services enclave 214 may be embodied as a secure enclave including code and/or data that is authenticated and protected from unauthorized access and/or modification by the processor 120, such as a secure enclave established using Intel® SGX technology. Thus, the platform services enclave 214 provides an isolated and secure execution environment within the virtual machine 206.

Each platform services module 212 is further configured to receive, by the platform services enclave 214, a platform service request via an authenticated communication session with the application enclave 210. Each platform services module 212 is further configured to transmit, by the platform services enclave 214, the platform service request to the virtual security engine 222 via an authenticated communication session with the virtual security engine 222. The platform service request may include a monotonic counter request or a trusted time request. In some embodiments, each platform services module 212 may be configured to proxy, by the platform services enclave 214, the platform service request received from the application enclave 210 to the virtual security engine 222. In some embodiments, each platform services module 212 may be configured to perform, by the platform services enclave 214, report-based attestation with the application enclave 210 and to perform, by the platform services enclave 214, quote-based remote attestation with the virtual security engine 222. Those functions may be performed by one or more sub-modules, such as a security engine proxy module 216 and/or an attestation module 218.

The virtual security engine module 220 is configured to establish the virtual security engine 222 in the host environment 202 of the computing device 100. In other words, the virtual security engine 222 is executed under the supervision of the VMM 204 and/or a host operating system with direct, non-virtualized access to the hardware of the computing device 100. For example, the virtual security engine 222 may be executed in the VMX-root mode. The virtual security engine 222 may be executed as part of the VMM 204 or host operating system (e.g., as a loadable module, driver, or other component) or as a user-level component (e.g., as a server process, module, driver, or other user-level component).

The virtual security engine module 220 is further configured to establish, by the virtual security engine 222, a long-term authenticated communication session with the security engine 132, and to transmit, by the host virtual security engine 222 in response to receiving a platform service request from a platform services enclave 214, the platform service request to the security engine 132 via the long-term authenticated communication session.

As described above, the security engine 132 establishes the security engine module 224. For example, the security engine module 224 may be embodied as a loadable firmware component of the security engine 132. The security engine module 224 is configured to perform, by the security engine 132, the platform service request with a hardware resource of the security engine 132. For example, the hardware resource may include the replay-protected monotonic counter 134 and/or the replay-protected data storage area (RP-DATA) 138 of the nonvolatile memory 136.

The host platform services module 226 is configured to establish a virtualization-aware platform services enclave 228. Similar to the application enclave 210 and the platform services enclave 214, each virtualization-aware platform services enclave 228 may be embodied as a secure enclave including code and/or data that is authenticated and protected from unauthorized access and/or modification by the processor 120, such as a secure enclave established using Intel® SGX technology. Thus, the platform services enclave 214 provides an isolated and secure execution environment within the host environment 202 of the computing device 100. The host platform services module 226 is further configured to establish the virtual security engine 222 within the virtualization-aware platform services enclave 228. Thus, in some embodiments the virtual security engine 222 may execute within an isolated and secure execution environment.

The host platform services module 226 is further configured to determine, by the virtual security engine 222, whether the virtual security engine 222 is established in the host environment 202 as opposed to within a virtual machine 206. If the virtual security engine 222 is determined to be established in the host environment 202, then the virtual security engine 222 may establish the long-term authenticated communication session with the security engine 132 as described above. If the virtual security engine 222 is determined not to be established in the host environment 202 (e.g., the virtual security engine 222 is determined to be established in a virtual machine 206), then the virtual security engine 222 may establish an authenticated communication session with a virtual security engine 222 that is established in the host environment 202.

Figure 3:
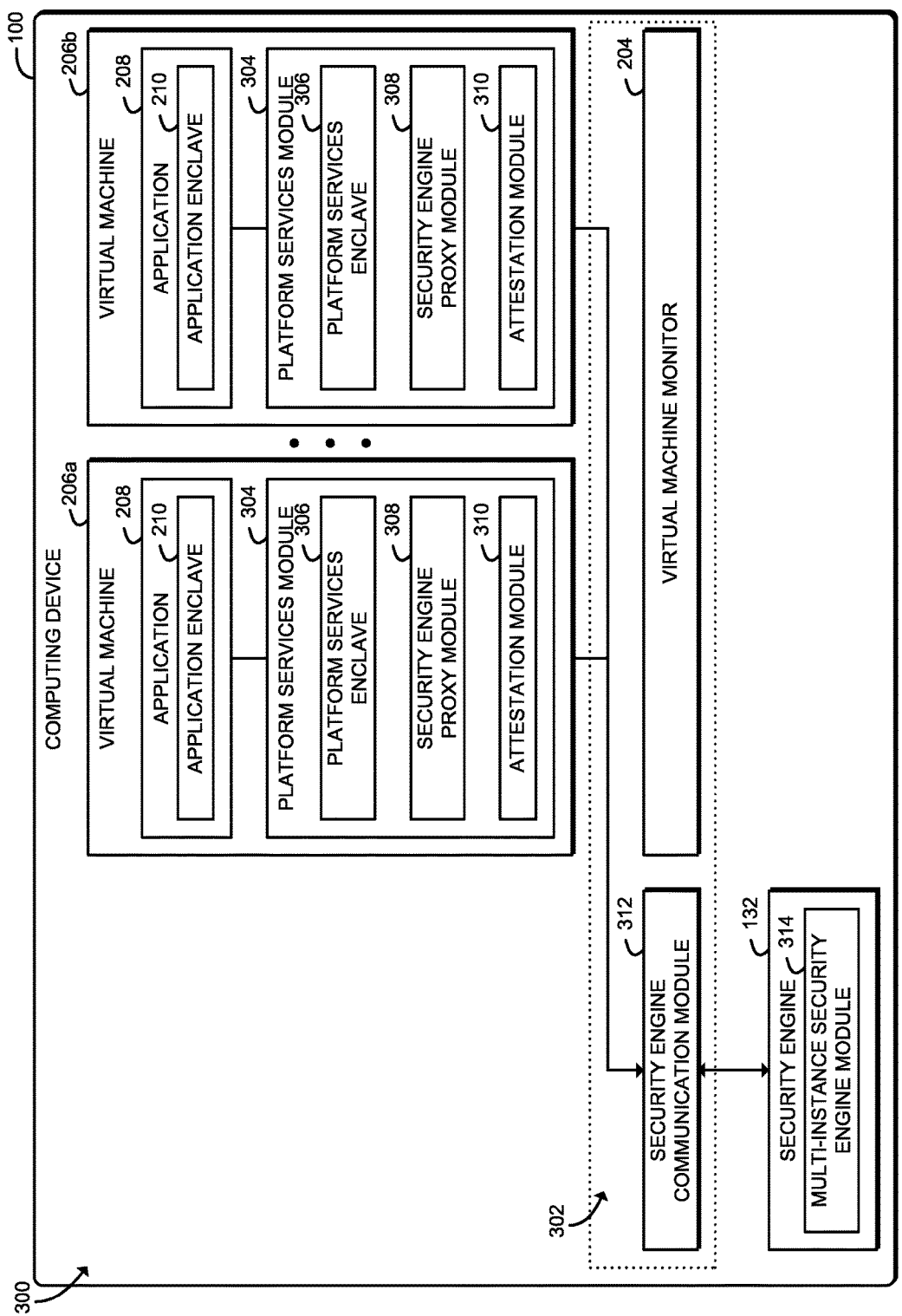

Referring now to FIG. 3, in an illustrative embodiment, the computing device 100 establishes an environment 300 during operation. The illustrative environment 300 includes a virtual machine monitor (VMM) 204, one or more virtual machines 206, a security engine communication module 312, and a multi-instance security engine module 314 established by the security engine 132. Each of the virtual machines 206 includes one or more applications 208 and a platform services module 304. As shown, the virtual machine monitor 204 and the security engine communication module 312 may be established by a host environment 302 of the computing device 100. The virtual machines 206 are not included in the host environment 302. The various modules of the environment 300 may be embodied as hardware, firmware, software, or a combination thereof. For example the various modules, logic, and other components of the environment 300 may form a portion of, or otherwise be established by, the processor 120, the security engine 132, or other hardware components of the computing device 100. As such, in some embodiments, any one or more of the modules of the environment 300 may be embodied as a circuit or collection of electrical devices (e.g., a platform services circuit, a multi-instance security engine circuit, etc.).

As shown, the VMM 204 may manage multiple virtual machines 206, and each virtual machine 206 may execute multiple applications 208 and/or application enclaves 210. The descriptions of those components are similar to the descriptions of the corresponding components of FIG. 2 and thus are not repeated herein, to improve the clarity of the present disclosure.

Each platform services module 304 is configured to establish a platform services enclave 306. Similar to the application enclave 210, each platform services enclave 306 may be embodied as a secure enclave including code and/or data that is authenticated and protected from unauthorized access and/or modification by the processor 120, such as a secure enclave established using Intel® SGX technology. Thus, the platform services enclave 306 provides an isolated and secure execution environment within the virtual machine 206.

Each platform services module 304 is further configured to establish, by the platform services enclave 306, a long-term authenticated communication session with the security engine 132. Each platform services module 304 is configured to receive, by the platform services enclave 306, a platform service request via an authenticated communication session with an application enclave 210. Each platform services module 304 is configured to transmit, by the platform service enclave 306, the platform service request to the security engine 132 via the long-term authenticated communication session. In some embodiments, each platform services module 304 may be configured to proxy, by the platform services enclave 306, the platform service request received from the application enclave 210 to a security engine messaging service, established as described below. In some embodiments, each platform services module 304 may be configured to perform, by the platform services enclave 306, report-based attestation with the application enclave 210 to establish the authenticated communication session. Those functions may be performed by one or more sub-modules, such as a security engine proxy module 308 and/or an attestation module 310.

The security engine communication module 312 is configured to establish a security engine messaging service in the host environment 302 of the computing device 100. The security engine communication module 312 is further configured to transmit, by the security engine messaging service, platform service requests received from the platform services enclaves 306 to the security engine 132 via a host embedded controller interface.

As described above, the security engine 132 establishes the multi-instance security engine module 314. For example, the multi-instance security engine module 314 may be embodied as a loadable firmware component of the security engine 132. The multi-instance security engine module 314 is configured to perform, by the security engine 132, the platform service request with a hardware resource of the security engine 132. The hardware resource is associated with the long-term authenticated communication session established with the platform services enclave 306. For example, the hardware resource may include the replay-protected monotonic counter 134 and/or the replay-protected data storage area (RPDATA) 138 of the nonvolatile memory 136.

Figure 4A:
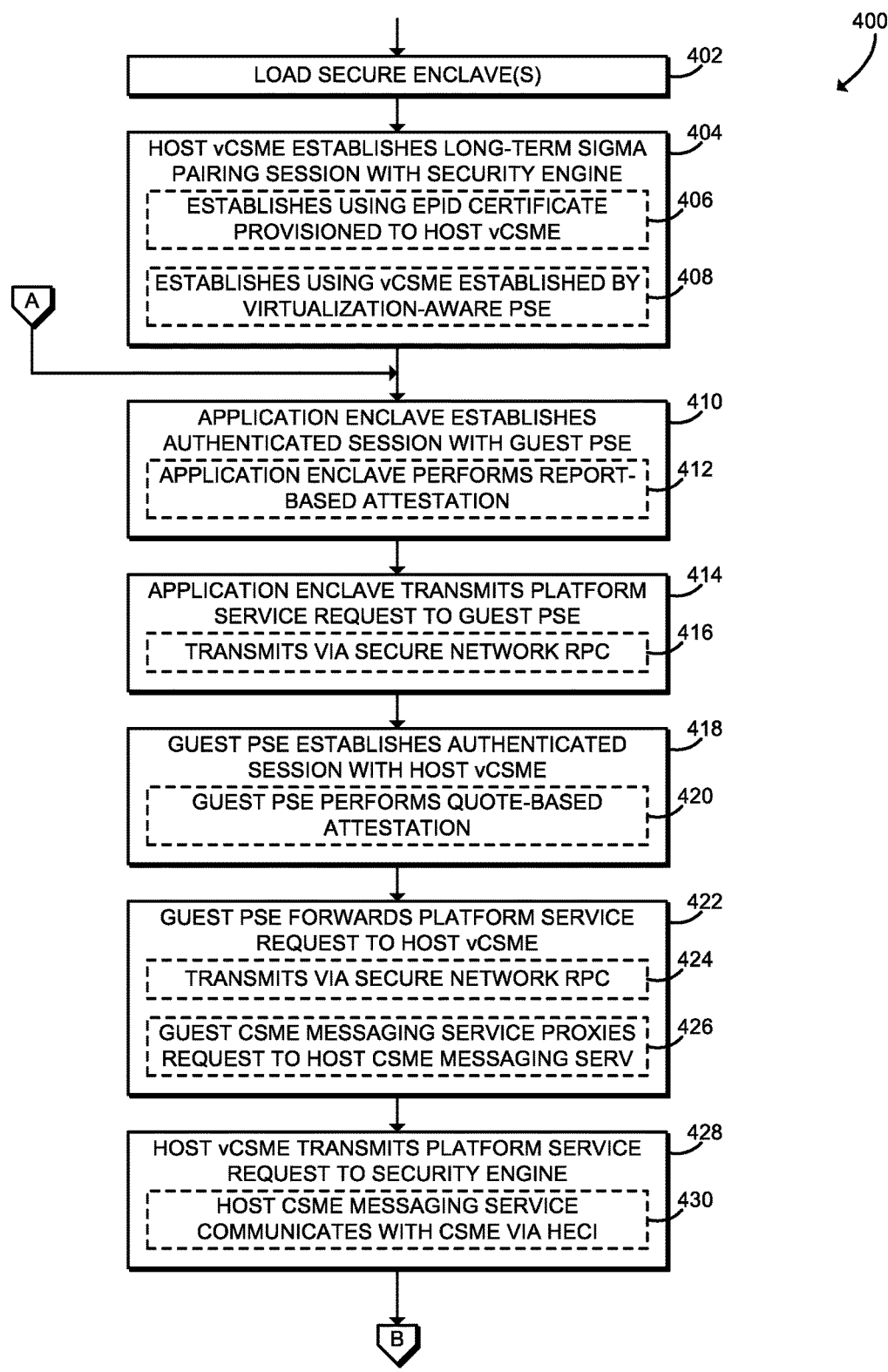
Figure 4B:
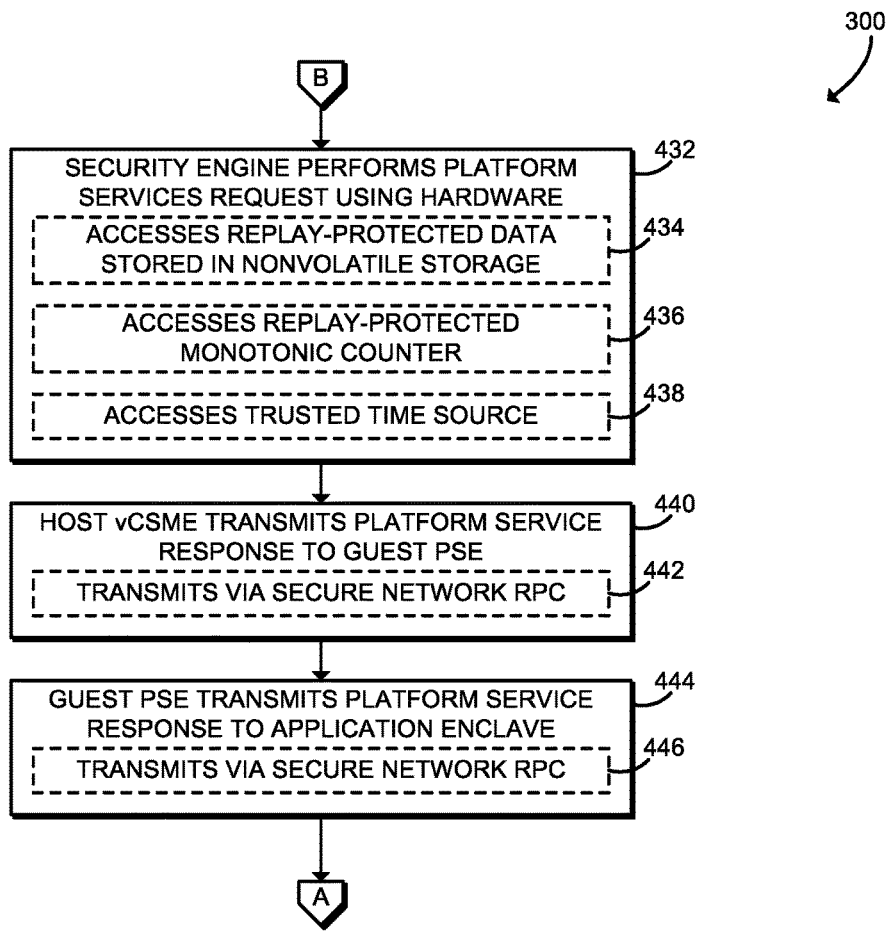

Referring now to FIGS. 4A and 4B, in use, the computing device 100 may execute a method 400 for virtualized access to security services provided by the security engine 132. The method 400 begins with block 402, in which the computing device 100 loads one or more secure enclaves using the secure enclave support 122 of the processor 120, for example, using Intel® SGX technology. In particular, the computing device 100 loads a platform services enclave 214 for every virtual machine 206 established by the VMM 204.

Additionally, the computing device 100 may load one or more application enclaves 210 for applications 208 operating within the virtual machines 206. In some embodiments, the computing device 100 may load a virtualization-aware platform services enclave 228 in the host environment 202. To load each secure enclave, the computing device 100 may execute one or more processor instructions to create the secure enclave, add memory pages to the secure enclave, and finalize measurements of the secure enclave. As memory pages are added into the secure enclave, the secure enclave support 122 may update a security log based on the contents of the memory pages and the order that the memory pages are added. Finalizing the secure enclave may generate a measurement based on the security log, for example by generating a secure hash value based on the security log. Additional memory pages may not be added to the secure enclave after the secure enclave has been finalized. The measurement of the secure enclave may be used to authenticate each secure enclave, as described further below. Additionally, although illustrated as loading the secure enclaves in block 402, it should be understood that in some embodiments the computing device 100 may load secure enclaves at other times. For example, an application 208 may load one or more application enclaves 210 as the application 208 is executed, and additional platform services enclaves 214 may be loaded as additional virtual machines 206 are created.

In block 404, the computing device 100 establishes a long-term pairing session with the security engine 132 using a SIGMA key-exchange protocol. The long-term pairing session may be embodied as, for example, a pairing session that persists across reboots. The computing device 100 may use the long-term pairing session to establish short-term ephemeral sessions that persist until the computing device 100 reboots. The computing device 100 establishes the long-term SIGMA pairing session using a virtual security engine (vCSME) 220 established in the host environment 202 of the computing device 100. For example, the virtual security engine 222 may be established by or as a part of the VMM 204 and/or a host operating system, outside of any virtual machine 206. In some embodiments, in block 406, the computing device 100 establishes the SIGMA pairing session using an enhanced privacy identifier (EPID) certificate that has been provisioned to the host virtual security engine 222. The virtual security engine 222 may be the only component of the computing device 100 provisioned with the EPID certificate and thus the only component of the computing device 100 that may establish a SIGMA pairing session with the security engine 132.

In some embodiments, in block 408 the computing device 100 may establish the pairing session using a virtual security engine 222 established by a virtualization-aware platform services enclave 228. The virtualization-aware platform services enclave 228 may determine whether it is executing in a virtual machine 206 or in the host environment 202 of the computing device 100. For example, the virtualization-aware platform services enclave 228 may determine whether direct access to the security engine 132 is available, for example through the HECI bus. If the virtualization-aware platform services enclave 228 is operating in the host environment 202, the virtualization-aware platform services enclave 228 may load or otherwise establish the virtual security engine 222 within the virtualization-aware platform services enclave 228. If the virtualization-aware platform services enclave 228 is not operating in the host environment 202, then the virtualization-aware platform services enclave 228 may perform the same operations as a platform services enclave 214 operating in a virtual machine 206, as described further below.

In block 410, an application enclave 210 operating within a virtual machine 206 establishes an authenticated communication session with a platform services enclave 214 operating within the same virtual machine 206. The authenticated communication session verifies that the application enclave 210 is authentic and has not been tampered with. In some embodiments, multiple application enclaves 210 operating within the same virtual machine 206 may establish authenticated communication sessions with the same platform services enclave 214. In some embodiments, in block 412 the application enclave 210 and the platform services enclave 214 may perform a report-based attestation flow to establish the authenticated communication session. Attestation proves that the application enclave 210 is a valid secure enclave, and that the application enclave 210 is authentic (i.e., the application enclave 210 has not been tampered with). To perform report-based attestation, the computing device 100 may perform an Intel® SGX technology secure enclave local attestation flow. The computing device 100 may generate a measurement of the application enclave 210. The measurement may be embodied as a cryptographically secure value that depends on the contents of memory pages added to the application enclave 210 as well as the order that the memory pages were added to the application enclave 210. For example, the measurement may be embodied as a cryptographic hash of a security log generated during construction of the application enclave 210. The measurement may be generated using a specialized processor instruction of the processor 120, such as the EREPORT instruction. The measurement may also be bound to the hardware of the computing device 100. For example, the measurement may include a message authentication code (MAC) generated using an encryption key (e.g., a report key) associated with the platform services enclave 214 established by the computing device 100.

In block 414, the application enclave 210 transmits a platform service request to the guest platform services enclave 214 using the authenticated communications session. The platform service request may include any request for security-related services that is to be sent to the security engine 132. For example, the computing device 100 may expose a request/response message interface to the security engine 132. In that example, the platform service request may include a request to get and/or update the current value of the RPDATA 138. The application enclave 210 may use any secure communication link to transfer the data to the guest platform services enclave 214. In some embodiments, in block 416, the application enclave 210 transmits the platform service request to the guest platform services enclave 214 using a secure network remote procedure call (RPC). For example, the platform service request may be transmitted using secure sockets over TCP.

In block 418, the guest platform services enclave 214 establishes an authenticated communication session with the virtual security engine 222 (vCSME) operating within the host environment 202 of the computing device 100. As described above, the authenticated communication session verifies that the application enclave 210 and/or the platform services enclave 214 are authentic and have not been tampered with. In some embodiments, multiple platform services enclaves 214 operating within multiple virtual machines 206 may establish authenticated communication sessions with the same virtual security engine 222. In some embodiments, in block 420 the platform services enclave

214 and the virtual security engine 222 may perform a quote-based attestation flow to establish the authenticated communication session. As described above, attestation proves that the application enclave 210 and/or the platform services enclave 214 is a valid secure enclave, and that the application enclave 210 and/or the platform services enclave 214 is authentic (i.e., the application enclave 210 and/or the platform services enclave 214 has not been tampered with).

To perform quote-based attestation, the computing device 100 may perform an Intel® SGX technology secure enclave remote attestation flow. As described above, the computing device 100 may generate a measurement of the application enclave 210 and/or the platform services enclave 214. The measurement may be embodied as a cryptographically secure value that depends on the contents of memory pages added to the application enclave 210 and/or the platform services enclave 214 as well as the order that the memory pages were added to the application enclave 210 and/or the platform services enclave 214. For example, the measurement may be embodied as a cryptographic hash of a security log generated during construction of the application enclave 210 and/or the platform services enclave 214. The measurement may be generated using a specialized processor instruction of the processor 120, such as the EREPORT instruction. The measurement may also be bound to the hardware of the computing device 100. For example, the measurement may include a message authentication code (MAC) generated using an encryption key (e.g., a report key) associated with the platform services enclave 214 or another enclave established by the computing device 100 (e.g., a quotation enclave). The computing device 100 may replace the MAC of the measurement with a signature created using a device-specific, private key associated with the computing device 100 to generate a quotation based on the report.

In block 422, the guest platform services enclave 214 forwards the platform service request to the virtual security engine 222 operating in the host environment 202. The guest platform services enclave 214 may use any secure communication link to transfer the data to the virtual security engine 222. In some embodiments, in block 424, the guest platform services enclave 214 transmits the platform service request to the virtual security engine 222 using a secure network remote procedure call (RPC). For example, the platform service request may be transmitted using secure sockets over TCP. In some embodiments, in block 426, the guest platform services enclave 214 may proxy the platform service request to the virtual service engine. For example, the guest platform services enclave 214 may establish a security engine messaging service that provides the same interface as a security engine messaging service provided by the virtual security engine 222 and/or the security engine 132. Thus, in some embodiments, the application enclave 210 may generate platform service requests that may be sent to the virtual security engine 222 or directly to the security engine 132 without modification.

In block 428, the virtual security engine 222 transmits the platform service request to the security engine 132. As described above, the virtual security engine 222 is the only component of the computing device 100 that communicates directly with the security engine 132, and thus the virtual security engine 222 may transmit platform security requests that originate from multiple application enclaves 210 and platform services enclaves 214 operating within multiple virtual machines 206. In some embodiments, in block 430 the computing device 100 may communicate with the security engine 132 over the HECI bus. As described above, the virtual security engine 222 and the security engine 132 may use long-term pairing information to establish a short-term ephemeral session on demand, and use this secure channel to communicate request and response messages over the HECI bus. For example, messages between the virtual security engine 222 and the security engine 132 may be encrypted and integrity protected using a shared secret key derived during the short-term protocol exchange using AES-GCM.

In block 432, shown in FIG. 4B, the security engine 132 performs the platform service request using platform hardware such as the replay-protected monotonic counter (RPMC) 134 and/or the replay protected data (RPDATA) 138. The security engine 132 may get or update a value and return a response to the virtual security engine 222 over the HECI bus. In some embodiments, in block 434 the security engine 132 may access the RPDATA 138 stored in the nonvolatile memory 136. For example, as described above, the security engine 132 may get or update the RPDATA 138. In some embodiments, in block 436, the security engine 132 may access the RPMC 134. In some embodiments, in block 438, the security engine 132 may access a trusted time source.

In block 440, the virtual security engine 222 transmits a platform service response to the guest platform services enclave 214. The platform service response may include counter data, status data, or other data received from the security engine 132, and may be generated by the security engine 132 or by the virtual security engine 222. In block 442, in some embodiments the virtual security engine 222 may transmit the platform service response to the guest platform services enclave 214 using a secure network remote procedure call, for example using secure sockets over TCP.

In block 444, the guest platform services enclave 214 transmits the platform service response to the application enclave 210. After receiving the platform service response, the application enclave 210 and/or the application 208 may perform one or more security operations using the platform service response. For example, the application enclave 210 and/or the application 208 may use the platform service response to track hash and/or MAC values of a database file, or use the platform service response to implement one or more monotonic counters to track the version of a database file. In block 446, in some embodiments the platform services enclave 214 may transmit the platform service response to the application enclave 210 using a secure network remote procedure call, for example using secure sockets over TCP. After returning the platform services response, the method 400 loops back to block 410 shown in FIG. 4A, in which the computing device 100 may process additional platform service requests.

Figure 5:
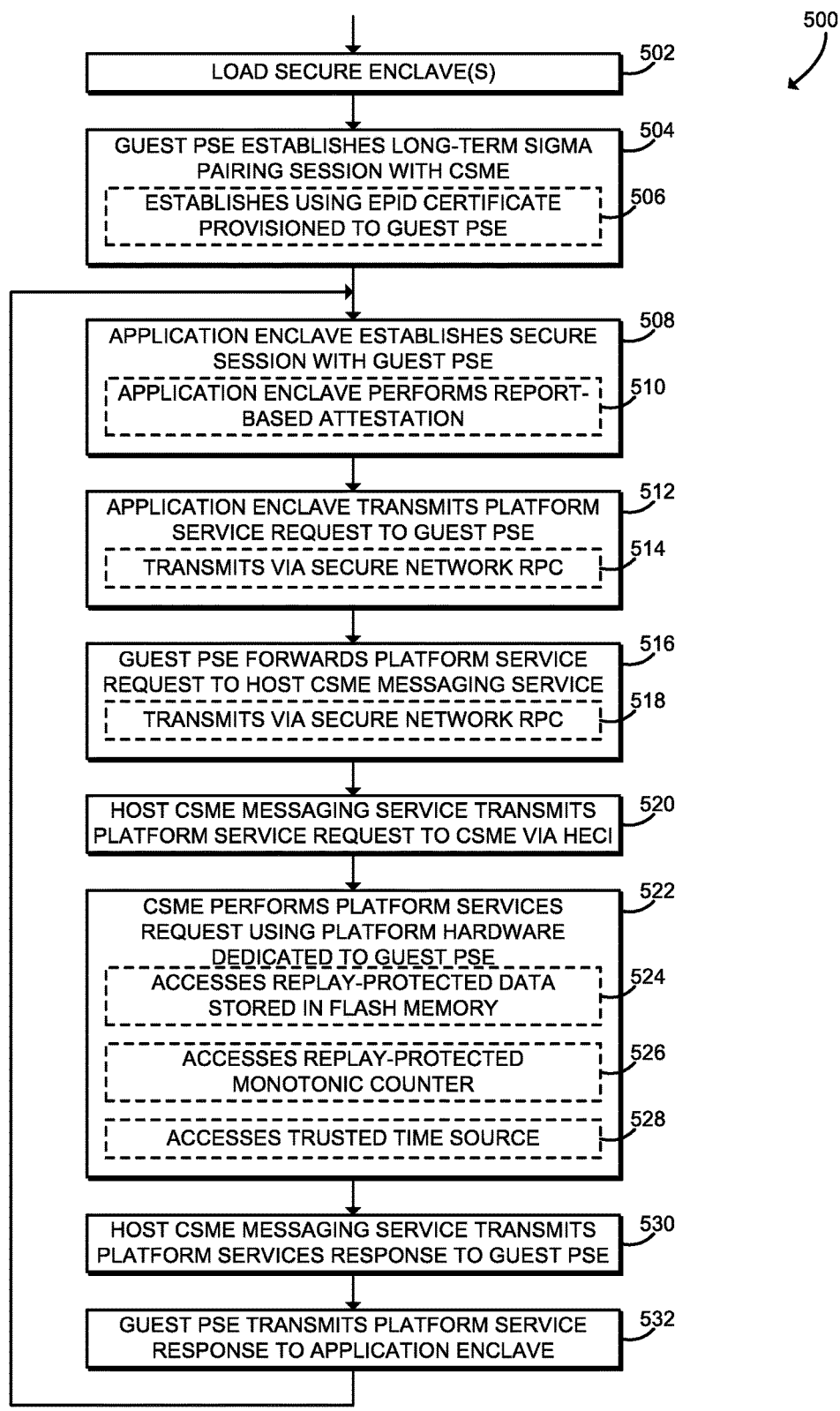

Referring now to FIG. 5, in use, the computing device 100 may execute a method 500 for virtualized access to security services provided by the security engine 132. The method 500 begins with block 502, in which the computing device 100 loads one or more secure enclaves using the secure enclave support 122 of the processor 120, for example, using Intel® SGX technology. In particular, the computing device 100 loads a platform services enclave 306 for every virtual machine 206 established by the VMM 204. Additionally, the computing device 100 may load one or more application enclaves 210 for applications 208 operating within the virtual machines 206. To load each secure enclave, the computing device 100 may execute one or more processor instructions to create the secure enclave, add memory pages to the secure enclave, and finalize measurements of the secure enclave. As memory pages are added into the secure enclave, the secure enclave support 122 may update a security log based on the contents of the memory pages and the order that the memory pages are added. Finalizing the secure enclave may generate a measurement based on the security log, for example by generating a secure hash value based on the security log. Additional memory pages may not be added to the secure enclave after the secure enclave has been finalized. The measurement of the secure enclave may be used to authenticate each secure enclave, as described further below. Additionally, although illustrated as loading the secure enclaves in block 502, it should be understood that in some embodiments the computing device 100 may load secure enclaves at other times. For example, an application 208 may load one or more application enclaves 210 as the application 208 is executed, and additional platform services enclaves 306 may be loaded as additional virtual machines 206 are created.

In block 504, a guest platform services enclave 306 of a virtual machine 206 establishes a long-term pairing session with the security engine 132 using a SIGMA key-exchange protocol. In embodiments having multiple virtual machines 206, the platform services enclave 306 of each virtual machine 206 may establish a different long-term SIGMA pairing session with the security engine 132. In some embodiments, in block 506, the platform services enclave 306 establishes the SIGMA pairing session using an enhanced privacy identifier (EPID) certificate that has been provisioned to the platform services enclave 306.

In block 508, an application enclave 210 operating within the virtual machine 206 establishes an authenticated communication session with the platform services enclave 306 operating within the same virtual machine 206. The authenticated communication session verifies that the application enclave 210 is authentic and has not been tampered with. In some embodiments, multiple application enclaves 210 operating within the same virtual machine 206 may establish authenticated communication sessions with the same platform services enclave 306. In some embodiments, in block 510 the application enclave 210 and the platform services enclave 306 may perform a report-based attestation flow to establish the authenticated communication session. Attestation proves that the application enclave 210 is a valid secure enclave, and that the application enclave 210 is authentic (i.e., the application enclave 210 has not been tampered with). To perform report-based attestation, the computing device 100 may perform an Intel® SGX technology secure enclave local attestation flow. The computing device 100 may generate a measurement of the application enclave 210. The measurement may be embodied as a cryptographically secure value that depends on the contents of memory pages added to the application enclave 210 as well as the order that the memory pages were added to the application enclave 210. For example, the measurement may be embodied as a cryptographic hash of a security log generated during construction of the application enclave 210. The measurement may be generated using a specialized processor instruction of the processor 120, such as the EREPORT instruction. The measurement may also be bound to the hardware of the computing device 100. For example, the measurement may include a message authentication code (MAC) generated using an encryption key (e.g., a report key) associated with the platform services enclave 306 established by the computing device 100.

In block 512, the application enclave 210 transmits a platform service request to the guest platform services enclave 306 using the authenticated communications session. The platform service request may include any request for security-related services that is to be sent to the security engine 132. For example, the computing device 100 may expose a request/response message interface to the security engine 132. In that example, the computing device 100 may provide a simple application programming interface (API) to communicate with the security engine 132, for example exposing a function in the form of STATUS=SendAndReceive (IN CSME_Service_handle, IN PS_Command, IN pse_message, OUT csme_message, OUT Resp_code). Potential messages to the security engine 132 may include messages to: establish a platform services enclave 306 to security engine 132 long-term pairing to establish a new RPDATA 138; get the 128-bit RPDATA 138; update the RPDATA 138 and return a new view; delete the platform services enclave 306 to security engine 132 long-term pairing; query the list of active pairings; enter recovery mode for RPDATA 138 cleanup; and/or free any inactive pairings identified in recovery mode. The application enclave 210 may use any secure communication link to transfer the data to the guest platform services enclave 306. In some embodiments, in block 514, the application enclave 210 transmits the platform service request to the guest platform services enclave 306 using a secure network remote procedure call (RPC). For example, the platform service request may be transmitted using secure sockets over TCP.

In block 516, the guest platform services enclave 306 forwards the platform service request to a security engine 132 messaging service operating in the host environment 302. The guest platform services enclave 306 may use any secure communication link to transfer the data to the host environment 302. In some embodiments, in block 518, the guest platform services enclave 306 transmits the platform service request to the security engine 132 messaging service using a secure network remote procedure call (RPC). For example, the platform service request may be transmitted using secure sockets over TCP.

In block 520, the security engine 132 messaging service in the host environment 302 transmits the platform service request to the security engine 132 over the HECI bus. The security engine 132 messaging service of the host environment 302 may forward platform service requests received from multiple platform services enclaves 306 established by multiple virtual machines 206. Because the messaging service in the host environment 302 is the only entity that communicates directly with the security engine 132, the VMM 204 and/or the virtual machines 206 may not expose the HECI bus and/or HECI drivers to the platform services enclaves 306 or other guest software executing within the virtual machines 206. The messaging service in the host environment 302 and the security engine 132 may use long-term pairing information to establish a short-term ephemeral session on demand, and use this secure channel to communicate request and response messages over the HECI bus. For example, messages between the messaging service and the security engine 132 may be encrypted and integrity protected using a shared secret key derived during the short-term protocol exchange using AES-GCM.

In block 522, the security engine 132 performs the platform service request using platform hardware that is dedicated to the guest platform services enclave 306. The security engine 132 may, for example, use hardware such as the replay-protected monotonic counter (RPMC) 134 and/or part of the replay protected data (RPDATA) 138 that has been associated with the long-term SIGMA pairing with the platform services enclave 306. Thus, the total number of platform services enclaves 306 supported by the security engine 132 may be limited by available hardware resources, such as available space in the nonvolatile memory 136 for the RPDATA 138. After performing the services request, the security engine 132 may get or update a value and return a response over the HECI bus. In some embodiments, in block 524 the security engine 132 may access the RPDATA 138 stored in the nonvolatile memory 136 that is associated with the particular SIGMA long-term pairing session of the platform services enclave 306. In some embodiments, in block 526, the security engine 132 may access the RPMC 134. In some embodiments, in block 528, the security engine 132 may access a trusted time source.

In block 530, the security engine 132 messaging service of the host environment 302 transmits a platform service response to the guest platform services enclave 306. The platform service response may include counter data, status data, or other data received from the security engine 132, and may be generated by the security engine 132 or by the messaging service. The platform service response may be transmitted using any appropriate technique, including using a secure network remote procedure call such as secure sockets over TCP.

In block 532, the guest platform services enclave 306 transmits the platform service response to the application enclave 210. After receiving the platform service response, the application enclave 210 and/or the application 208 may perform one or more security operations using the platform service response. For example, the application enclave 210 and/or the application 208 may use the platform service response to track hash and/or MAC values of a database file, or use the platform service response to implement one or more monotonic counters to track the version of a database file. The platform service response may be transmitted using any appropriate technique, including using a secure network remote procedure call such as secure sockets over TCP. After returning the platform services response, the method 500 loops back to block 508 to continue processing platform service requests.

EXAMPLES

Illustrative examples of the technologies disclosed herein are provided below. An embodiment of the technologies may include any one or more, and any combination of, the examples described below.

Example 1 includes a computing device for providing security-related platform services, the computing device comprising a processor that includes secure enclave support; a platform services module to: (i) receive, by a guest platform services enclave established by the processor to be associated with a virtual machine of the computing device, a platform service request via a first authenticated communication session with an application enclave established by the processor to be associated with the virtual machine and (ii) transmit, by the guest platform services enclave, the platform service request to a host virtual security engine established by a host environment of the computing device via a second authenticated communication session with the host virtual security engine; a virtual security engine module to: (i) establish, by the virtual security engine, a long-term authenticated communication session with a security engine of the computing device and (ii) transmit, by the host virtual security engine in response to receipt of the platform service request, the platform service request to the security engine via the long-term authenticated communication session; and a security engine module to perform, by the security engine, the platform service request with a hardware resource of the security engine.

Example 2 includes the subject matter of Example 1, and wherein the platform service request comprises a monotonic counter request or a trusted time request.

Example 3 includes the subject matter of any of Examples 1 and 2, and wherein the hardware resource of the security engine comprises a replay-protected data storage area.

Example 4 includes the subject matter of any of Examples 1-3, and further comprising an attestation module to perform, by the guest platform services enclave, report-based attestation with the application enclave to establish the first authenticated communication session with the application enclave; and perform, by the guest platform services enclave, quote-based remote attestation with the host virtual security engine to establish the second authenticated communication session with the host virtual security engine.

Example 5 includes the subject matter of any of Examples 1-4, and wherein to receive, by the guest platform services enclave, the platform service request comprises to receive the platform service request via a secure network connection with the application enclave; and to transmit, by the guest platform services enclave, the platform service request comprises to transmit the platform service request via a secure network connection with the host virtual security engine.

Example 6 includes the subject matter of any of Examples 1-5, and wherein to transmit, by the guest platform services enclave, the platform service request comprises to proxy, by the guest platform services enclave, the platform service request received from the application enclave to the host virtual security engine.

Example 7 includes the subject matter of any of Examples 1-6, and wherein to transmit, by the host virtual security engine, the platform service request to the security engine via the long-term authenticated communication session comprises to transmit the platform service request via a host embedded controller interface.

Example 8 includes the subject matter of any of Examples 1-7, and further comprising a host platform services module to establish, by the processor of the computing device, a host platform services enclave in the host environment of the computing device; establish, by the host platform services enclave, the host virtual security engine in the host environment of the computing device; and determine, by the host virtual security engine, whether the host virtual security engine is established in the host environment; wherein to establish the long-term authenticated communication session with the security engine of the computing device comprises to establish the long-term authenticated communication session in response to a determination that the host virtual security engine is established in the host environment.

Example 9 includes the subject matter of any of Examples 1-8, and wherein the platform services module is further to (i) receive, by a second guest platform services enclave established by the processor of the computing device to be associated with a second virtual machine of the computing device, a second platform service request from a second application enclave via a third authenticated communication session with the second application enclave and (ii) transmit, by the second guest platform services enclave, the second platform service request to the host virtual security engine via a fourth authenticated communication session with the host virtual security engine; the virtual security engine module is further to transmit, by the host virtual security engine in response to receipt of the second platform service request, the second platform service request to the security engine via the long-term authenticated communication session; and the security engine module is further to perform, by the security engine, the second platform service request with the hardware resource of the security engine.

Example 10 includes the subject matter of any of Examples 1-9, and wherein the security engine comprises a converged manageability and security engine.

Example 11 includes the subject matter of any of Examples 1-10, and wherein the computing device comprises a system-on-a-chip, the system-on-a-chip to include the processor and the security engine.

Example 12 includes the subject matter of any of Examples 1-11, and wherein to establish the long-term authenticated communication session comprises to establish a SIGMA pairing session with an EPID certificate provisioned to the host virtual security engine of the computing device.

Example 13 includes the subject matter of any of Examples 1-12, and wherein the host environment comprises a virtual machine monitor or a host operating system.

Example 14 includes a computing device for providing security-related platform services, the computing device comprising a processor that includes secure enclave support; a platform services module to: (i) establish, by the processor, a guest platform services enclave to be associated with a virtual machine of the computing device, (ii) establish, by the guest platform services enclave, a long-term authenticated communication session with a security engine of the computing device, (iii) receive, by the guest platform services enclave, a platform service request via an authenticated communication session with an application enclave established by the processor to be associated with the virtual machine, and (iv) transmit, by the guest platform service enclave in response to receipt of the platform service request, the platform service request to the security engine via the long-term authenticated communication session; and a multi-instance security engine module to perform, by the security engine, the platform service request with a hardware resource of the security engine, wherein the hardware resource is associated with the long-term authenticated communication session.

Example 15 includes the subject matter of Example 14, and wherein the platform service request comprises a monotonic counter request or a trusted time request.

Example 16 includes the subject matter of any of Examples 14 and 15, and wherein the hardware resource of the security engine comprises a replay-protected data storage area.

Example 17 includes the subject matter of any of Examples 14-16, and further comprising an attestation module to perform, by the guest platform services enclave, report-based attestation with the application enclave to establish the authenticated communication session with the application enclave.

Example 18 includes the subject matter of any of Examples 14-17, and wherein to receive, by the guest platform services enclave, the platform service request comprises to receive the platform service request via a secure network connection.

Example 19 includes the subject matter of any of Examples 14-18, and further comprising a security engine communication module to establish a security engine messaging service in a host environment of the computing device; and transmit, by the security engine messaging service, the platform service request to the security engine via a host embedded controller interface; wherein to transmit, by the guest platform service enclave, the platform service request to the security engine via the long-term authenticated communication session comprises to proxy, by the guest platform services enclave, the platform service request received from the application enclave to the security engine messaging service.

Example 20 includes the subject matter of any of Examples 14-19, and wherein the platform services module is further to: (i) establish, by the processor, a second guest platform services enclave to be associated with a second virtual machine of the computing device, (ii) establish, by the second guest platform services enclave, a second long-term authenticated communication session with the security engine of the computing device, (iii) receive, by the second guest platform services enclave, a second platform service request via a second authenticated communication session with a second application enclave established by the processor to be associated with the second virtual machine, and (iv) transmit, by the second guest platform service enclave in response to receipt of the second platform service request, the second platform service request to the security engine via the second long-term authenticated communication session; and the multi-instance security engine module is further to perform, by the security engine, the second platform service request with a second hardware resource of the security engine, wherein the second hardware resource is associated with the second long-term authenticated communication session.

Example 21 includes the subject matter of any of Examples 14-20, and wherein the security engine comprises a converged manageability and security engine.

Example 22 includes the subject matter of any of Examples 14-21, and wherein the computing device comprises a system-on-a-chip, the system-on-a-chip to include the processor and the security engine.

Example 23 includes the subject matter of any of Examples 14-22, and wherein to establish the long-term authenticated communication session comprises to establish a SIGMA pairing session using an EPID certificate provisioned to the guest platform services enclave of the computing device.

Example 24 includes a method for providing security-related platform services, the method comprising establishing, by a virtual security engine established by a host environment of a computing device, a long-term authenticated communication session with a security engine of the computing device; receiving, by a guest platform services enclave established by a processor of the computing device in a virtual machine of the computing device, a platform service request via a first authenticated communication session with an application enclave established by the processor in the virtual machine; transmitting, by the guest platform services enclave, the platform service request to the host virtual security engine via a second authenticated communication session with the host virtual security engine; transmitting, by the host virtual security engine in response to receiving the platform service request, the platform service request to the security engine via the long-term authenticated communication session; and performing, by the security engine, the platform service request using a hardware resource of the security engine.

Example 25 includes the subject matter of Example 24, and wherein the platform service request comprises a monotonic counter request or a trusted time request.

Example 26 includes the subject matter of any of Examples 24 and 25, and wherein the hardware resource of the security engine comprises a replay-protected data storage area.

Example 27 includes the subject matter of any of Examples 24-26, and further comprising performing, by the guest platform services enclave, report-based attestation with the application enclave to establish the first authenticated communication session with the application enclave; and performing, by the guest platform services enclave, quote-based remote attestation with the host virtual security engine to establish the second authenticated communication session with the host virtual security engine.

Example 28 includes the subject matter of any of Examples 24-27, and wherein receiving, by the guest platform services enclave, the platform service request comprises receiving the platform service request via a secure network connection with the application enclave; and transmitting, by the guest platform services enclave, the platform service request comprises transmitting the platform service request via a secure network connection with the host virtual security engine.

Example 29 includes the subject matter of any of Examples 24-28, and wherein transmitting, by the guest platform services enclave, the platform service request comprises proxying, by the guest platform services enclave, the platform service request received from the application enclave to the host virtual security engine.

Example 30 includes the subject matter of any of Examples 24-29, and wherein transmitting, by the host virtual security engine, the platform service request to the security engine via the long-term authenticated communication session comprises transmitting the platform service request via a host embedded controller interface.

Example 31 includes the subject matter of any of Examples 24-30, and further comprising establishing, by the processor of the computing device, a host platform services enclave in the host environment of the computing device; establishing, by the host platform services enclave, the host virtual security engine in the host environment of the computing device; and determining, by the host virtual security engine, whether the host virtual security engine is established in the host environment; wherein establishing the long-term authenticated communication session with the security engine of the computing device comprises establishing the long-term authenticated communication session in response to determining that the host virtual security engine is established in the host environment.

Example 32 includes the subject matter of any of Examples 24-31, and further comprising receiving, by a second guest platform services enclave established by the processor of the computing device in a second virtual machine of the computing device, a second platform service request from a second application enclave via a third authenticated communication session with the second application enclave; transmitting, by the second guest platform services enclave, the second platform service request to the host virtual security engine via a fourth authenticated communication session with the host virtual security engine; transmitting, by the host virtual security engine in response to receiving the second platform service request, the second platform service request to the security engine via the long-term authenticated communication session; and performing, by the security engine, the second platform service request using the hardware resource of the security engine.

Example 33 includes the subject matter of any of Examples 24-32, and wherein the security engine comprises a converged manageability and security engine.

Example 34 includes the subject matter of any of Examples 24-33, and wherein the computing device comprises a system-on-a-chip, the system-on-a-chip to include the processor and the security engine.

Example 35 includes the subject matter of any of Examples 24-34, and wherein establishing the long-term authenticated communication session comprises establishing a SIGMA pairing session using an EPID certificate provisioned to the host virtual security engine of the computing device.

Example 36 includes the subject matter of any of Examples 24-35, and wherein the host environment comprises a virtual machine monitor or a host operating system.

Example 37 includes a method for providing security-related platform services, the method comprising establishing, by a processor of a computing device, a guest platform services enclave in a virtual machine of the computing device; establishing, by the guest platform services enclave, a long-term authenticated communication session with a security engine of the computing device; receiving, by the guest platform services enclave, a platform service request via an authenticated communication session with an application enclave established by the processor in the virtual machine; transmitting, by the guest platform service enclave in response to receiving the platform service request, the platform service request to the security engine via the long-term authenticated communication session; and performing, by the security engine, the platform service request using a hardware resource of the security engine, wherein the hardware resource is associated with the long-term authenticated communication session.

Example 38 includes the subject matter of Example 37, and wherein the platform service request comprises a monotonic counter request or a trusted time request.

Example 39 includes the subject matter of any of Examples 37 and 38, and wherein the hardware resource of the security engine comprises a replay-protected data storage area.

Example 40 includes the subject matter of any of Examples 37-39, and further comprising performing, by the guest platform services enclave, report-based attestation with the application enclave to establish the authenticated communication session with the application enclave.

Example 41 includes the subject matter of any of Examples 37-40, and wherein receiving, by the guest platform services enclave, the platform service request comprises receiving the platform service request via a secure network connection.

Example 42 includes the subject matter of any of Examples 37-41, and wherein transmitting, by the guest platform service enclave, the platform service request to the security engine via the long-term authenticated communication session comprises proxying, by the guest platform services enclave, the platform service request received from the application enclave to a security engine messaging service established by a host environment of the computing device; and transmitting, by the security engine messaging service, the platform service request to the security engine via a host embedded controller interface.

Example 43 includes the subject matter of any of Examples 37-42, and further comprising establishing, by the processor of the computing device, a second guest platform services enclave in a second virtual machine of the computing device; establishing, by the second guest platform services enclave, a second long-term authenticated communication session with the security engine of the computing device; receiving, by the second guest platform services enclave, a second platform service request via a second authenticated communication session with a second application enclave established by the processor in the second virtual machine; transmitting, by the second guest platform service enclave in response to receiving the second platform service request, the second platform service request to the security engine via the second long-term authenticated communication session; and performing, by the security engine, the second platform service request using a second hardware resource of the security engine, wherein the second hardware resource is associated with the second long-term authenticated communication session.

Example 44 includes the subject matter of any of Examples 37-43, and wherein the security engine comprises a converged manageability and security engine.

Example 45 includes the subject matter of any of Examples 37-44, and wherein the computing device comprises a system-on-a-chip, the system-on-a-chip to include the processor and the security engine.

Example 46 includes the subject matter of any of Examples 37-45, and wherein establishing the long-term authenticated communication session comprises establishing a SIGMA pairing session using an EPID certificate provisioned to the guest platform services enclave of the computing device.

Example 47 includes a computing device comprising a processor; and a memory having stored therein a plurality of instructions that when executed by the processor cause the computing device to perform the method of any of Examples 24-46.

Example 48 includes one or more machine readable storage media comprising a plurality of instructions stored thereon that in response to being executed result in a computing device performing the method of any of Examples 24-46.

Example 49 includes a computing device comprising means for performing the method of any of Examples 24-46.

Example 50 includes a computing device for providing security-related platform services, the computing device comprising means for establishing, by a virtual security engine established by a host environment of the computing device, a long-term authenticated communication session with a security engine of the computing device; means for receiving, by a guest platform services enclave established by a processor of the computing device in a virtual machine of the computing device, a platform service request via a first authenticated communication session with an application enclave established by the processor in the virtual machine; means for transmitting, by the guest platform services enclave, the platform service request to the host virtual security engine via a second authenticated communication session with the host virtual security engine; means for transmitting, by the host virtual security engine in response to receiving the platform service request, the platform service request to the security engine via the long-term authenticated communication session; and means for performing, by the security engine, the platform service request using a hardware resource of the security engine.

Example 51 includes the subject matter of Example 50, and wherein the platform service request comprises a monotonic counter request or a trusted time request.

Example 52 includes the subject matter of any of Examples 50 and 51, and wherein the hardware resource of the security engine comprises a replay-protected data storage area.

Example 53 includes the subject matter of any of Examples 50-52, and further comprising means for performing, by the guest platform services enclave, report-based attestation with the application enclave to establish the first authenticated communication session with the application enclave; and means for performing, by the guest platform services enclave, quote-based remote attestation with the host virtual security engine to establish the second authenticated communication session with the host virtual security engine.

Example 54 includes the subject matter of any of Examples 50-53, and wherein the means for receiving, by the guest platform services enclave, the platform service request comprises means for receiving the platform service request via a secure network connection with the application enclave; and the means for transmitting, by the guest platform services enclave, the platform service request comprises means for transmitting the platform service request via a secure network connection with the host virtual security engine.

Example 55 includes the subject matter of any of Examples 50-54, and wherein the means for transmitting, by the guest platform services enclave, the platform service request comprises means for proxying, by the guest platform services enclave, the platform service request received from the application enclave to the host virtual security engine.

Example 56 includes the subject matter of any of Examples 50-55, and wherein the means for transmitting, by the host virtual security engine, the platform service request to the security engine via the long-term authenticated communication session comprises means for transmitting the platform service request via a host embedded controller interface.

Example 57 includes the subject matter of any of Examples 50-56, and further comprising means for establishing, by the processor of the computing device, a host platform services enclave in the host environment of the computing device; means for establishing, by the host platform services enclave, the host virtual security engine in the host environment of the computing device; and means for determining, by the host virtual security engine, whether the host virtual security engine is established in the host environment; wherein the means for establishing the long-term authenticated communication session with the security engine of the computing device comprises means for establishing the long-term authenticated communication session in response to determining that the host virtual security engine is established in the host environment.

Example 58 includes the subject matter of any of Examples 50-57, and further comprising means for receiving, by a second guest platform services enclave established by the processor of the computing device in a second virtual machine of the computing device, a second platform service request from a second application enclave via a third authenticated communication session with the second application enclave; means for transmitting, by the second guest platform services enclave, the second platform service request to the host virtual security engine via a fourth authenticated communication session with the host virtual security engine; means for transmitting, by the host virtual security engine in response to receiving the second platform service request, the second platform service request to the security engine via the long-term authenticated communication session; and means for performing, by the security engine, the second platform service request using the hardware resource of the security engine.

Example 59 includes the subject matter of any of Examples 50-58, and wherein the security engine comprises a converged manageability and security engine.

Example 60 includes the subject matter of any of Examples 50-59, and wherein the computing device comprises a system-on-a-chip, the system-on-a-chip to include the processor and the security engine.

Example 61 includes the subject matter of any of Examples 50-60, and wherein establishing the long-term authenticated communication session comprises establishing a SIGMA pairing session using an EPID certificate provisioned to the host virtual security engine of the computing device.

Example 62 includes the subject matter of any of Examples 50-61, and wherein the host environment comprises a virtual machine monitor or a host operating system.

Example 63 includes a computing device for providing security-related platform services, the computing device comprising means for establishing, by a processor of a computing device, a guest platform services enclave in a virtual machine of the computing device; means for establishing, by the guest platform services enclave, a long-term authenticated communication session with a security engine of the computing device; means for receiving, by the guest platform services enclave, a platform service request via an authenticated communication session with an application enclave established by the processor in the virtual machine; means for transmitting, by the guest platform service enclave in response to receiving the platform service request, the platform service request to the security engine via the long-term authenticated communication session; and means for performing, by the security engine, the platform service request using a hardware resource of the security engine, wherein the hardware resource is associated with the long-term authenticated communication session.

Example 64 includes the subject matter of Example 63, and wherein the platform service request comprises a monotonic counter request or a trusted time request.

Example 65 includes the subject matter of any of Examples 63 and 64, and wherein the hardware resource of the security engine comprises a replay-protected data storage area.

Example 66 includes the subject matter of any of Examples 63-65, and further comprising means for performing, by the guest platform services enclave, report-based attestation with the application enclave to establish the authenticated communication session with the application enclave.

Example 67 includes the subject matter of any of Examples 63-66, and wherein the means for receiving, by the guest platform services enclave, the platform service request comprises means for receiving the platform service request via a secure network connection.

Example 68 includes the subject matter of any of Examples 63-67, and wherein the means for transmitting, by the guest platform service enclave, the platform service request to the security engine via the long-term authenticated communication session comprises means for proxying, by the guest platform services enclave, the platform service request received from the application enclave to a security engine messaging service established by a host environment of the computing device; and means for transmitting, by the security engine messaging service, the platform service request to the security engine via a host embedded controller interface.

Example 69 includes the subject matter of any of Examples 63-68, and further comprising means for establishing, by the processor of the computing device, a second guest platform services enclave in a second virtual machine of the computing device; means for establishing, by the second guest platform services enclave, a second long-term authenticated communication session with the security engine of the computing device; means for receiving, by the second guest platform services enclave, a second platform service request via a second authenticated communication session with a second application enclave established by the processor in the second virtual machine; means for transmitting, by the second guest platform service enclave in response to receiving the second platform service request, the second platform service request to the security engine via the second long-term authenticated communication session; and means for performing, by the security engine, the second platform service request using a second hardware resource of the security engine, wherein the second hardware resource is associated with the second long-term authenticated communication session.

Example 70 includes the subject matter of any of Examples 63-69, and wherein the security engine comprises a converged manageability and security engine.

Example 71 includes the subject matter of any of Examples 63-70, and wherein the computing device comprises a system-on-a-chip, the system-on-a-chip to include the processor and the security engine.

Example 72 includes the subject matter of any of Examples 63-71, and wherein establishing the long-term authenticated communication session comprises establishing a SIGMA pairing session using an EPID certificate provisioned to the guest platform services enclave of the computing device.

The invention claimed is:

1. A computing device for providing security-related platform services, the computing device comprising:
a processor that includes secure enclave support, wherein the processor is to (i) execute a host environment and a virtual machine, wherein the virtual machine is executed in a guest mode of the processor, (ii) load, with the secure enclave support, a guest platform services enclave in the virtual machine, wherein the guest platform services enclave comprises a trusted execution environment that is isolated from the virtual machine, and (iii) load, with the secure enclave support, an application enclave in the virtual machine, wherein the application enclave comprises a trusted execution environment that is isolated from the virtual machine and from the guest platform services enclave;
a security engine;
a platform services module to: (i) receive, by the guest platform services enclave, a platform service request via a first authenticated communication session with the application enclave and (ii) transmit, by the guest platform services enclave, the platform service request to a host virtual security engine established by the host environment via a second authenticated communication session with the host virtual security engine; and
a virtual security engine module to: (i) establish, by the host virtual security engine, a long-term authenticated communication session with the security engine and (ii) transmit, by the host virtual security engine in response to receipt of the platform service request, the platform service request to the security engine via the long-term authenticated communication session;

wherein the security engine is to perform the platform service request with a hardware resource of the security engine.

2. The computing device of claim 1, wherein the platform service request comprises a monotonic counter request or a trusted time request.

3. The computing device of claim 1, wherein the hardware resource of the security engine comprises a replay-protected data storage area.

4. The computing device of claim 1, further comprising an attestation module to:
perform, by the guest platform services enclave, report-based attestation with the application enclave to establish the first authenticated communication session with the application enclave, wherein to perform the report-based attestation comprises to verify that the application enclave is authentic; and
perform, by the guest platform services enclave, quote-based remote attestation with the host virtual security engine to establish the second authenticated communication session with the host virtual security engine.

5. The computing device of claim 1, wherein:
to receive, by the guest platform services enclave, the platform service request comprises to receive the platform service request via a secure network connection with the application enclave; and
to transmit, by the guest platform services enclave, the platform service request comprises to transmit the platform service request via a secure network connection with the host virtual security engine.

6. The computing device of claim 5, wherein to transmit, by the guest platform services enclave, the platform service request comprises to proxy, by the guest platform services enclave, the platform service request received from the application enclave to the host virtual security engine.

7. The computing device of claim 1, further comprising a host platform services module to:
establish, by the processor of the computing device, a host platform services enclave in the host environment of the computing device;
establish, by the host platform services enclave, the host virtual security engine in the host environment of the computing device; and
determine, by the host virtual security engine, whether the host virtual security engine is established in the host environment;
wherein to establish the long-term authenticated communication session with the security engine of the computing device comprises to establish the long-term authenticated communication session in response to a determination that the host virtual security engine is established in the host environment.

8. The computing device of claim 1, wherein:
the processor is further to (i) execute a second virtual machine, wherein the virtual machine is executed in the guest mode of the processor, (ii) load, with the secure enclave support, a second guest platform services enclave in the second virtual machine, wherein the second guest platform services enclave comprises a trusted execution environment that is isolated from the second virtual machine, and (iii) load, with the secure enclave support, a second application enclave in the second virtual machine, wherein the second application enclave comprises a trusted execution environment that is isolated from the second virtual machine and from the second guest platform services enclave; and
the platform services module is further to (i) receive, by the second guest platform services enclave, a second platform service request from the second application enclave via a third authenticated communication session with the second application enclave and (ii) transmit, by the second guest platform services enclave, the second platform service request to the host virtual security engine via a fourth authenticated communication session with the host virtual security engine;
the virtual security engine module is further to transmit, by the host virtual security engine in response to receipt of the second platform service request, the second platform service request to the security engine via the long-term authenticated communication session; and
the security engine is further to perform the second platform service request with the hardware resource of the security engine.

9. The computing device of claim 1, wherein to establish the long-term authenticated communication session comprises to establish a SIGMA pairing session with an EPID certificate provisioned to the host virtual security engine of the computing device.

10. One or more non-transitory, computer-readable storage media comprising a plurality of instructions that in response to being executed cause a computing device to:
execute, by a processor of the computing device, a host environment and a virtual machine, wherein the virtual machine is executed in a guest mode of the processor;
load, by the processor with secure enclave support of the processor, a guest platform services enclave in the virtual machine, wherein the guest platform services enclave comprises a trusted execution environment that is isolated from the virtual machine;
load, by the processor with the secure enclave support, an application enclave in the virtual machine, wherein the application enclave comprises a trusted execution environment that is isolated from the virtual machine and from the guest platform services enclave;
establish, by a virtual security engine established by the host environment of the computing device, a long-term authenticated communication session with a security engine of the computing device;
receive, by the guest platform services enclave, a platform service request via a first authenticated communication session with the application enclave;
transmit, by the guest platform services enclave, the platform service request to the host virtual security engine via a second authenticated communication session with the host virtual security engine;
transmit, by the host virtual security engine in response to receiving the platform service request, the platform service request to the security engine via the long-term authenticated communication session; and
perform, by the security engine, the platform service request using a hardware resource of the security engine.

11. The one or more non-transitory, computer-readable storage media of claim 10, wherein the hardware resource of the security engine comprises a replay-protected data storage area.

12. The one or more non-transitory, computer-readable storage media of claim 10, further comprising a plurality of instructions that in response to being executed cause the computing device to:

perform, by the guest platform services enclave, report-based attestation with the application enclave to establish the first authenticated communication session with the application enclave, wherein to perform the report-based attestation comprises to verify that the application enclave is authentic; and perform, by the guest platform services enclave, quote-based remote attestation with the host virtual security engine to establish the second authenticated communication session with the host virtual security engine.

13. The one or more non-transitory, computer-readable storage media of claim 10, further comprising a plurality of instructions that in response to being executed cause the computing device to:

establish, by the processor of the computing device, a host platform services enclave in the host environment of the computing device;

establish, by the host platform services enclave, the host virtual security engine in the host environment of the computing device; and determine, by the host virtual security engine, whether the host virtual security engine is established in the host environment;

wherein to establish the long-term authenticated communication session with the security engine of the computing device comprises to establish the long-term authenticated communication session in response to determining that the host virtual security engine is established in the host environment.

14. The one or more non-transitory, computer-readable storage media of claim 10, further comprising a plurality of instructions that in response to being executed cause the computing device to:

execute, by the processor, a second virtual machine, wherein the virtual machine is executed in the guest mode of the processor;

load, by the processor with the secure enclave support, a second guest platform services enclave in the second virtual machine, wherein the second guest platform services enclave comprises a trusted execution environment that is isolated from the second virtual machine;

load, by the processor with the secure enclave support, a second application enclave in the second virtual machine, wherein the second application enclave comprises a trusted execution environment that is isolated from the second virtual machine and from the second guest platform services enclave;

receive, by the second guest platform services enclave, a second platform service request from the second application enclave via a third authenticated communication session with the second application enclave;

transmit, by the second guest platform services enclave, the second platform service request to the host virtual security engine via a fourth authenticated communication session with the host virtual security engine;

transmit, by the host virtual security engine in response to receiving the second platform service request, the second platform service request to the security engine via the long-term authenticated communication session; and perform, by the security engine, the second platform service request using the hardware resource of the security engine.

15. A computing device for providing security-related platform services, the computing device comprising:

a processor that includes secure enclave support, wherein the processor is to (i) execute a virtual machine in a guest mode of the processor, (ii) load, with the secure enclave support, a guest platform services enclave in the virtual machine, wherein the guest platform services enclave comprises a trusted execution environment that is isolated from the virtual machine, and (iii) load, with the secure enclave support, an application enclave in the virtual machine, wherein the application enclave comprises a trusted execution environment that is isolated from the virtual machine and from the guest platform services enclave;

a security engine that includes a plurality of hardware resources; and a platform services module to: (i) establish, by the guest platform services enclave, a long-term authenticated communication session with the security engine of the computing device, (ii) receive, by the guest platform services enclave, a platform service request via an authenticated communication session with the application enclave, and (iii) transmit, by the guest platform service enclave in response to receipt of the platform service request, the platform service request to the security engine via the long-term authenticated communication session;

wherein the security engine is to perform the platform service request with a hardware resource of the plurality of hardware resources, wherein the hardware resource is associated with the long-term authenticated communication session.

16. The computing device of claim 15, wherein the hardware resource of the security engine comprises a replay-protected data storage area.

17. The computing device of claim 15, wherein to receive, by the guest platform services enclave, the platform service request comprises to receive the platform service request via a secure network connection.

18. The computing device of claim 17, further comprising a security engine communication module to:

establish a security engine messaging service in a host environment of the computing device; and transmit, by the security engine messaging service, the platform service request to the security engine via a host embedded controller interface;

wherein to transmit, by the guest platform service enclave, the platform service request to the security engine via the long-term authenticated communication session comprises to proxy, by the guest platform services enclave, the platform service request received from the application enclave to the security engine messaging service.

19. The computing device of claim 15, wherein:

the processor is further to (i) execute a second virtual machine in the guest mode of the processor, (ii) load, with the secure enclave support, a second guest platform services enclave in the second virtual machine, wherein the second guest platform services enclave comprises a trusted execution environment that is isolated from the second virtual machine, and (iii) load, with the secure enclave support, a second application enclave in the virtual machine, wherein the second application enclave comprises a trusted execution environment that is isolated from the second virtual machine and from the second guest platform services enclave;

the platform services module is further to: (i) establish, by the second guest platform services enclave, a second long-term authenticated communication session with the security engine of the computing device, (ii) receive, by the second guest platform services enclave, a second platform service request via a second authenticated communication session with the second application enclave, and (iii) transmit, by the second guest platform service enclave in response to receipt of the second platform service request, the second platform service request to the security engine via the second long-term authenticated communication session; and the security engine is further to perform the second platform service request with a second hardware resource of the plurality of hardware resources, wherein the second hardware resource is associated with the second long-term authenticated communication session.

20. The computing device of claim 15, wherein to establish the long-term authenticated communication session comprises to establish a SIGMA pairing session using an EPID certificate provisioned to the guest platform services enclave of the computing device.

21. One or more non-transitory, computer-readable storage media comprising a plurality of instructions that in response to being executed cause a computing device to:

execute, by a processor of the computing device, a virtual machine in a guest mode of the processor;

load, by the processor with secure enclave support of the processor, a guest platform services enclave in the virtual machine, wherein the guest platform services enclave comprises a trusted execution environment that is isolated from the virtual machine;

load, by the processor with the secure enclave support, an application enclave in the virtual machine, wherein the application enclave comprises a trusted execution environment that is isolated from the virtual machine and from the guest platform services enclave;

establish, by the guest platform services enclave, a long-term authenticated communication session with a security engine of the computing device;

receive, by the guest platform services enclave, a platform service request via an authenticated communication session with the application enclave;

transmit, by the guest platform service enclave in response to receiving the platform service request, the platform service request to the security engine via the long-term authenticated communication session; and perform, by the security engine, the platform service request using a hardware resource of a plurality of hardware resources of the security engine, wherein the hardware resource is associated with the long-term authenticated communication session.

22. The one or more non-transitory, computer-readable storage media of claim 21, wherein the hardware resource of the security engine comprises a replay-protected data storage area.

23. The one or more non-transitory, computer-readable storage media of claim 21, wherein to receive, by the guest platform services enclave, the platform service request comprises to receive the platform service request via a secure network connection.

24. The one or more non-transitory, computer-readable storage media of claim 23, wherein to transmit, by the guest platform service enclave, the platform service request to the security engine via the long-term authenticated communication session comprises to:

proxy, by the guest platform services enclave, the platform service request received from the application enclave to a security engine messaging service established by a host environment of the computing device; and transmit, by the security engine messaging service, the platform service request to the security engine via a host embedded controller interface.

25. The one or more non-transitory, computer-readable storage media of claim 21, further comprising a plurality of instructions that in response to being executed cause the computing device to:

execute, by the processor, a second virtual machine in the guest mode of the processor;

load, by the processor with the secure enclave support, a second guest platform services enclave in the second virtual machine, wherein the second guest platform services enclave comprises a trusted execution environment that is isolated from the second virtual machine;

load, by the processor with the secure enclave support, a second application enclave in the second virtual machine, wherein the second application enclave comprises a trusted execution environment that is isolated from the second virtual machine and from the second guest platform services enclave;

establish, by the second guest platform services enclave, a second long-term authenticated communication session with the security engine of the computing device;

receive, by the second guest platform services enclave, a second platform service request via a second authenticated communication session with the second application enclave;

transmit, by the second guest platform service enclave in response to receiving the second platform service request, the second platform service request to the security engine via the second long-term authenticated communication session; and perform, by the security engine, the second platform service request using a second hardware resource of the plurality of hardware resources, wherein the second hardware resource is associated with the second long-term authenticated communication session.

* * * * *